US011223820B2

(12) United States Patent
Danziger

(10) Patent No.: US 11,223,820 B2
(45) Date of Patent: *Jan. 11, 2022

(54) AUGMENTED REALITY DISPLAYS WITH ACTIVE ALIGNMENT AND CORRESPONDING METHODS

(71) Applicant: LUMUS LTD., Ness Ziona (IL)

(72) Inventor: Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,803

(22) Filed: Dec. 15, 2020

(65) Prior Publication Data

US 2021/0099691 A1    Apr. 1, 2021

Related U.S. Application Data

(63) Continuation of application No. 16/707,000, filed on Dec. 9, 2019, now Pat. No. 10,869,024, which is a continuation of application No. 16/238,578, filed on Jan. 3, 2019, now Pat. No. 10,506,220, which is a continuation of application No. PCT/IB2019/050014, filed on Jan. 2, 2019.

(60) Provisional application No. 62/612,740, filed on Jan. 2, 2018.

(51) Int. Cl.
*H04N 13/327* (2018.01)
*H04N 13/344* (2018.01)

(52) U.S. Cl.
CPC ......... *H04N 13/327* (2018.05); *H04N 13/344* (2018.05)

(58) Field of Classification Search
None
See application file for complete search history.

(56) References Cited

U.S. PATENT DOCUMENTS

| 4,720,189 A | 1/1988 | Heynen et al. |
| 5,076,664 A | 12/1991 | Migozzi |
| 5,430,505 A | 7/1995 | Katz |
| 6,154,321 A | 11/2000 | Melville et al. |
| 6,264,328 B1 | 7/2001 | Williams et al. |
| 6,404,550 B1 | 6/2002 | Yajima |
| 6,542,307 B2 | 4/2003 | Gleckman et al. |

(Continued)

FOREIGN PATENT DOCUMENTS

| JP | 08-313843 | 11/1996 |
| JP | 2012-37761 U | 2/2012 |

*Primary Examiner* — Christopher Braniff
(74) *Attorney, Agent, or Firm* — Mark M. Friedman

(57) ABSTRACT

Binocular augmented reality display devices and corresponding methods allow alignment calibration to be performed by an end user. According to one approach, a camera is positioned to have a field of view which includes simultaneously part of a projected image from the left-eye display and part of a projected image from the right-eye display. By projecting via each display at least part of a calibration image and identifying within the camera-sampled image right-field and left-field alignment features, an alignment correction can be derived. Alternative approaches employ correlation of images sampled by forward-looking cameras rigidly associated with the respective right-eye and left-eye display units, or require a user to input a manual adjustment for aligning transversely-swapped camera images with the real world view.

14 Claims, 13 Drawing Sheets

(56) References Cited

U.S. PATENT DOCUMENTS

| | | |
|---|---|---|
| 6,671,100 B1 | 12/2003 | McRuer |
| 6,879,443 B2 | 4/2005 | Spitzer et al. |
| 9,170,425 B1 | 10/2015 | Harrison et al. |
| 9,638,920 B2 | 5/2017 | Bohn |
| 2007/0165192 A1 | 7/2007 | Prior |
| 2008/0106775 A1 | 5/2008 | Amitai et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2010/0077049 A1 | 3/2010 | Appelman et al. |
| 2010/0171680 A1 | 7/2010 | Lapidot et al. |
| 2011/0010988 A1 | 1/2011 | Lanoha |
| 2011/0176218 A1 | 7/2011 | Noui |
| 2012/0179369 A1 | 7/2012 | Lapidot et al. |
| 2012/0218301 A1 | 8/2012 | Miller |
| 2013/0208362 A1 | 8/2013 | Bohn et al. |
| 2013/0229717 A1 | 9/2013 | Amitai |
| 2013/0276960 A1 | 10/2013 | Amitai |
| 2013/0279017 A1 | 10/2013 | Amitai |
| 2014/0027232 A1 | 1/2014 | Mccollum |
| 2014/0014065 A1 | 5/2014 | Brown et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0019801 A1 | 7/2014 | Lamb et al. |
| 2014/0240834 A1 | 8/2014 | Mason |
| 2015/0138451 A1 | 5/2015 | Amitai |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0028976 A1 | 10/2015 | Popovitch et al. |
| 2015/0277127 A1 | 10/2015 | Amitai |
| 2015/0293360 A1 | 10/2015 | Amitai |
| 2015/0035481 A1 | 12/2015 | Hilkes et al. |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0020965 A1 | 7/2016 | Popovich et al. |
| 2016/0314564 A1 | 10/2016 | Jones |
| 2016/0341964 A1 | 11/2016 | Amitai |
| 2016/0349518 A1 | 12/2016 | Amitai et al. |
| 2017/0003504 A1 | 1/2017 | Vallius |
| 2017/0045744 A1 | 2/2017 | Amitai |
| 2017/0052376 A1 | 2/2017 | Amitai |
| 2017/0052377 A1 | 2/2017 | Amitai |
| 2017/0122725 A1 | 5/2017 | Yeoh |
| 2017/0146802 A1 | 5/2017 | Pletenetskyy |
| 2017/0336636 A1 | 11/2017 | Amitai et al. |
| 2017/0353714 A1* | 12/2017 | Poulad ............... H04N 13/383 |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0275409 A1 | 9/2018 | Gao et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0159354 A1 | 5/2019 | Zheng et al. |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |

* cited by examiner

AUGMENTED REALITY DISPLAYS WITH ACTIVE ALIGNMENT AND CORRESPONDING METHODS

FIELD AND BACKGROUND OF THE INVENTION

The present invention relates to augmented reality displays and, in particular, it concerns binocular augmented reality displays with arrangements for adjusting alignment of the left-eye and right-eye displays of a binocular augmented reality display, and corresponding alignment methods.

Augmented reality spectacles must be aligned accurately in order to provide an effective binocular observation experience of the augmented image, and even relatively small misalignment may risk causing eye strain or headaches. Conventional approaches typically involve mounting the left-eye and right-eye displays on a mechanically rigid common support structure, illustrated in FIG. 1A, to achieve preliminary alignment and a fixed relative position of the displays. Final fine alignment is achieved by electronic shift of the image, as illustrated schematically in FIG. 1B, which shows an image generating matrix 30 (i.e., the physical extremities of the display field of view), and a transformed projected image 32 according to a calibration matrix, typically programmed into firmware associated with each display, to achieve correct alignment between the displays. The margins between 30 and 32 are designed into the system to accommodate any transformation required to correct misalignment within predefined limits.

An exemplary alignment process according to this approach is illustrated herein with reference to FIGS. 1A-2. The electronic alignment parameters are generated by placing the spectacles in front of two co-aligned cameras and comparing the orientation of the augmented images generated by the two projectors. The derived calibration data is introduced to the transformation firmware of the image projectors. Alternatively, the mechanical alignment of the optical system can be accurate to within the required optical accuracy. The above alignment process requires a dedicated optical alignment bench, and is only suitable for implementation in a production facility.

There is a need to implement augmented reality spectacles in a lightweight and compact form factor in order to make the technology more suitable for the consumer market. Lightweight implementations, however, often lack sufficient mechanical rigidity to ensure invariant alignment of the two displays over time, instead being subject to variations due to thermal variations and other mechanical or environmental influences.

Additionally, the inter-pupillary distance (IPD, distance between the eyes) can vary by up to 15 millimeters for different people. As a result, if the two projectors are connected rigidly, each of the eye-boxes (i.e., the illumination area of each projector where the eye pupil is expected to be, shown as region 10 in FIG. 1A) must be wider by 15/2=7.5 mm for each eye in order to accommodate every possible user having any IPD within the defined margin. The large eye-box dictates bulkier and more expensive optics. If a mechanism is provided for IPD adjustment, this typically introduces additional uncertainty into the alignment between the two displays, rendering any pre-calibrated alignment correction unreliable.

SUMMARY OF THE INVENTION

The present invention is a binocular augmented reality display with an arrangement for adjusting alignment of the left-eye and right-eye displays of a binocular augmented reality display, and a corresponding alignment method.

According to the teachings of an embodiment of the present invention there is provided, a method for deriving an alignment correction between a right-eye display and a left-eye display of a binocular augmented reality display device, the method comprising the steps of: (a) positioning a camera having a field of view so that the camera field of view includes simultaneously part of a projected image from the left-eye display and part of a projected image from the right-eye display; (b) projecting via each of the right-eye display and left-eye display at least part of a calibration image including at least one right-field alignment feature and at least one left-field alignment feature; (c) employing the camera to sample an image; (d) identifying within the image the right-field alignment feature and the left-field alignment feature; and (e) deriving from a position within the image of the right-field alignment feature and the left-field alignment feature an alignment correction between the right-eye display and the left-eye display of the augmented reality display device.

According to a further feature of an embodiment of the present invention, the camera is positioned on the viewing side of the augmented reality display device, such that the image includes the right-field alignment feature viewed via the right-eye display and the left-field alignment feature viewed via the left-eye display.

According to a further feature of an embodiment of the present invention, the projected calibration image is displayed with an apparent focal distance, and wherein the camera is focused at the apparent focal distance.

According to a further feature of an embodiment of the present invention, the camera is positioned on an opposite side from the viewing side of the augmented reality display device so that the camera captures an outwardly reflected portion of image illumination from each of the right-eye display and the left-eye display, and such that the image includes the left-field alignment feature viewed via the right-eye display and the right-field alignment feature viewed via the left-eye display.

According to a further feature of an embodiment of the present invention, the camera is a hand-held camera, the method further comprising displaying via the right-eye display and/or the left-eye display at least one indication to a user to assist in correct positioning of the camera.

According to a further feature of an embodiment of the present invention: (a) features associated with the binocular augmented reality display device sufficient to define at least three fiducial points are identified within the image; and (b) a position of the camera is determined relative to the at least three fiducial points.

According to a further feature of an embodiment of the present invention, the positioning includes directing the camera towards a mirror so that the reflected field of view includes simultaneously part of a projected image from the left-eye display and part of a projected image from the right-eye display.

According to a further feature of an embodiment of the present invention, the camera is a camera of a mobile device integrated with a screen, the method further comprising displaying via the screen at least one indication to a user to assist in correct positioning of the camera.

According to a further feature of an embodiment of the present invention, an alignment correction to the augmented reality display device is implemented based on the derived alignment correction.

There is also provided according to the teachings of an embodiment of the present invention, a method for stereoscopic alignment correction between a right-eye display and a left-eye display of a binocular augmented reality display device, the method comprising the steps of: (a) providing an augmented reality device comprising: (i) a right-eye display unit comprising a first augmented reality display rigidly integrated with a forward-looking first camera, (ii) a left-eye display unit comprising a second augmented reality display rigidly integrated with a forward-looking second camera, and (iii) a support structure interconnecting between the right-eye display unit and the left-side display unit; (b) providing a first alignment mapping between the first camera and the first augmented reality display and a second alignment mapping between the second camera and the second augmented reality display; (c) sampling at least one image from the first camera; (d) sampling at least one image from the second camera; (e) co-processing the images from the first and second cameras to derive an inter-camera mapping indicative of a relative orientation between the first camera and the second camera; (f) combining the inter-camera mapping with the first alignment mapping and the second alignment mapping to derive an inter-display alignment mapping indicative of a relative orientation of the first augmented reality display and the second augmented reality display; and (g) implementing an alignment correction to the augmented reality display device based on the inter-display alignment mapping.

According to a further feature of an embodiment of the present invention, the at least one image from the first camera and the second camera are sampled for a distant scene.

According to a further feature of an embodiment of the present invention, the at least one image from the first camera and the second camera are multiple images, and wherein the co-processing includes deriving a three-dimensional model of at least part of a scene included in the multiple images.

There is also provided according to the teachings of an embodiment of the present invention, a method for stereoscopic alignment correction between a right-eye display and a left-eye display of a binocular augmented reality display device, the method comprising the steps of: (a) providing an augmented reality device comprising a right-eye augmented reality display, a left-eye augmented reality display, a right camera spatially associated with the right-eye augmented reality display, and a left camera spatially associated with the left-eye augmented reality display; (b) performing a first cross-registration process comprising: (i) obtaining at least one image of a scene sampled by the right camera, (ii) displaying via the left-eye augmented reality display at least one alignment feature derived from the at least one image sampled by the right camera, (iii) receiving an input from the user indicative of an alignment offset between the at least one alignment feature and a corresponding directly-viewed feature of the scene, and (iv) correcting a position of display of the at least one alignment feature according to the user input until the at least one alignment feature is aligned with the corresponding directly-viewed feature of the scene; (c) performing a second cross-registration process comprising: (i) obtaining at least one image of a scene sampled by the left camera, (ii) displaying via the right-eye augmented reality display at least one alignment feature derived from the at least one image sampled by the left camera, (iii) receiving an input from the user indicative of an alignment offset between the at least one alignment feature and a corresponding directly-viewed feature of the scene, and (iv) correcting a position of display of the at least one alignment feature according to the user input until the at least one alignment feature is aligned with the corresponding directly-viewed feature of the scene; and (d) implementing an alignment correction to the augmented reality display device based on the user inputs.

According to a further feature of an embodiment of the present invention, the at least one alignment feature for each of the cross-registration processes is at least part of the sampled image.

According to a further feature of an embodiment of the present invention, the at least one alignment feature for each of the cross-registration processes is a location marker corresponding to a feature detected in the sampled image.

According to a further feature of an embodiment of the present invention, an estimated distance to an object in the sampled image is obtained, the estimated distance being employed to implement the alignment correction.

According to a further feature of an embodiment of the present invention, the right camera is rigidly mounted relative to the right-eye augmented reality display, and wherein the left camera is rigidly mounted relative to the left-eye display, the alignment correction being implemented using relative alignment data for the right camera relative to the right-eye augmented reality display and relative alignment data for the left camera relative to the left-eye augmented reality display.

According to a further feature of an embodiment of the present invention, at least one additional registration process is performed to receive user inputs for correcting an alignment of at least one of the right-eye augmented reality display and the left-eye augmented reality display relative to the corresponding one of the right camera and the left camera.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1B:
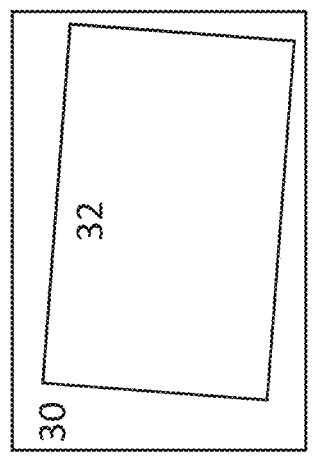
FIG. 1B is a schematic representation explaining a principle of electronic alignment correction for augmented reality displays.
Figure 1A:
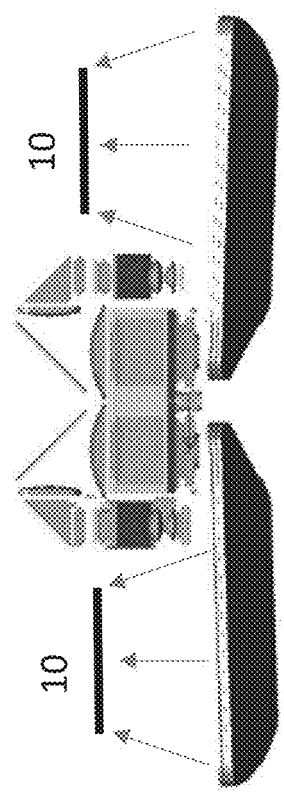
FIG. 1A, described above, is a top view of a binocular augmented reality display according to the prior art.
Figure 2:
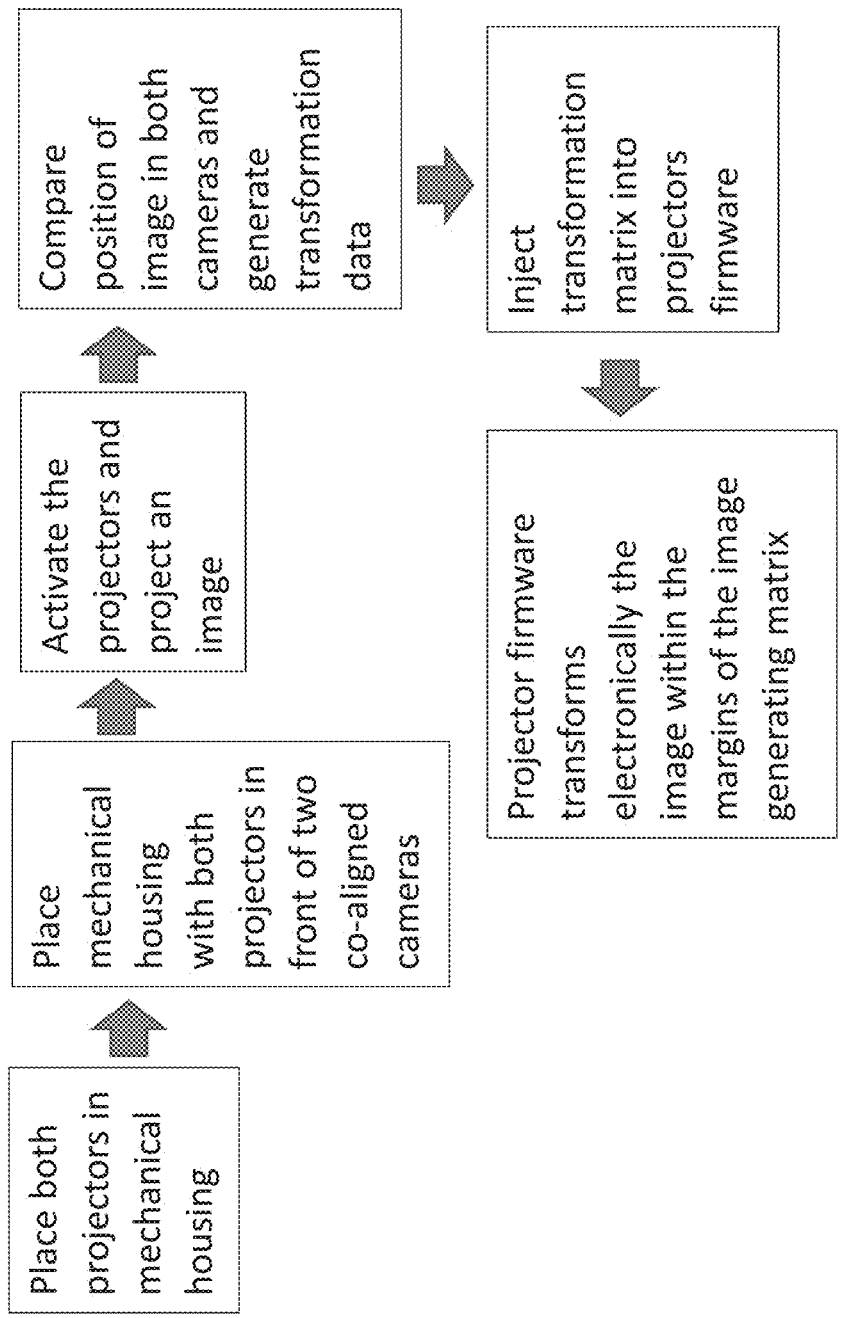
FIG. 2 is a flow diagram illustrating a factory adjustment process for calibrating an augmented reality display according to the prior art.

The present invention is a binocular augmented reality display with an arrangement for adjusting alignment of the left-eye and right-eye displays of a binocular augmented reality display, and corresponding alignment methods.

The principles and operation of devices and methods according to the present invention may be better understood with reference to the drawings and the accompanying description.

By way of introduction, the present invention addresses a range of situations in which pre-calibrated alignment between a right-eye display and a left-eye display of a binocular augmented reality display either does not exist or cannot be considered reliable. This may be due to the use of lightweight structural components which cannot ensure invariant rigid alignment of the components over an extended period of time and/or varying environmental conditions, or may be due to the presence of an adjustment mechanism, particularly an IPD adjustment mechanism, which may result in imprecise final alignment of the displays. Presence of an IPD adjustment mechanism is particularly preferred, thereby allowing an augmented reality display device to accommodate users with differing interpupillary distances while reducing the requirements for projector eye-box size and consequent projector bulk, complexity and cost. However, an IPD adjustment mechanism typically introduces variability into the alignment of the two display projectors.

To address these issues, the present invention provides three groups of solutions which allow calibration, or recalibration, of alignment of the right and left eye displays of a binocular augmented reality display device in the end-user's normal working environment, and without the need for any specialized equipment. Specifically, a first subset of alignment correction techniques are implemented as an automated, or semi-automated, alignment process based on correlation of images sampled by bilateral cameras associated with respective left and right eye displays. A second subset of alignment correction techniques, also utilizing cameras mounted on the device, requires user inputs to align displayed features with corresponding real-world features. Finally, a third subset of alignment correction techniques are applicable without reliance on cameras mounted on the device, instead relying upon an external camera. Each of these subsets of techniques also preferably corresponds to a distinct implementation of a binocular augmented reality device with control components configured to implement the corresponding technique(s). Each approach will now be described in detail.

Referring now to the drawings, FIG. 3-8 illustrate various aspects of a binocular augmented reality display device, an initial partial alignment process, and a corresponding method for stereoscopic alignment correction between a right-eye display and a left-eye display of a binocular augmented reality display device, all according to a first approach of an aspect of the present invention. According to this approach, each of the two displays ("projectors") is rigidly attached to a forward looking camera. A support structure bridging between the eye-projectors is relatively less rigid and/or can be modified and locked by the user according to his or her personal IPD. The images of a scene received by the cameras are compared and a transformation matrix is derived for the projectors.

Thus, in general terms, there is provided an augmented reality device that includes a right-eye display unit having a first augmented reality display rigidly integrated with a forward-looking first camera, and a left-eye display unit having a second augmented reality display rigidly integrated with a forward-looking second camera. The augmented reality device also includes a support structure interconnecting between the right-eye display unit and the left-side display unit. According to a preferred aspect of this approach, each display unit is rigid, such that each camera is in fixed alignment with the corresponding augmented reality display, and the system is provided with, or derives, an alignment mapping between each camera and the corresponding augmented reality display, typically in the form of a transformation matrix which maps the camera alignment to the display, i.e., that would allow display of the camera image correctly aligned with the real world for a distant scene viewed through the augmented reality display. The support structure, on the other hand, is not necessarily assumed to sufficiently rigid to provide invariant alignment between the left-eye and right-eye display units over a period of time, and in certain particularly preferred implementations, includes an adjustment mechanism, allowing adjustment of the IPD for different users, which typically results in some variation of angular alignment during adjustment.

An alignment correction is then preferably performed by a processing system associated with the augmented reality display device, which may be an onboard processing system or may be a processing system associated with the device via a short-range or long-range communication connection. Here and elsewhere in this application, the processing described may be performed by standard processing components, which may be general purpose hardware configured by suitable software, or ASICs or other dedicated or semi-dedicated hardware, as readily chosen by a person ordinarily skilled in the art according to what it most suited to the functions described herein. Furthermore, the processing may be performed at any location, or combination of locations, including but not limited to, one or more onboard processor forming part of the augmented reality display device, a mobile communications device in wired or wireless connection with the AR display device, a server located at a remote location and connected to the AR display device via a WAN, and a cloud computing virtual machine made up of dynamically allocated computing resources. Details of the processing system implementations are not necessary for an implementation of the present invention, and will therefore not be described herein in further detail.

The alignment correction process according to an aspect of the present invention preferably includes:
i. sampling at least one image from the first camera;
ii. sampling at least one image from the second camera;
iii. co-processing the images from the first and second cameras to derive an inter-camera mapping indicative of a relative orientation between the first camera and the second camera;
iv. combining the inter-camera mapping with the first alignment mapping and the second alignment mapping to derive an inter-display alignment mapping indicative of a relative orientation of the first augmented reality display and the second augmented reality display; and
v. implementing an alignment correction to the augmented reality display device based on the inter-display alignment mapping.

This process will be discussed in more detail below.

Figure 3:
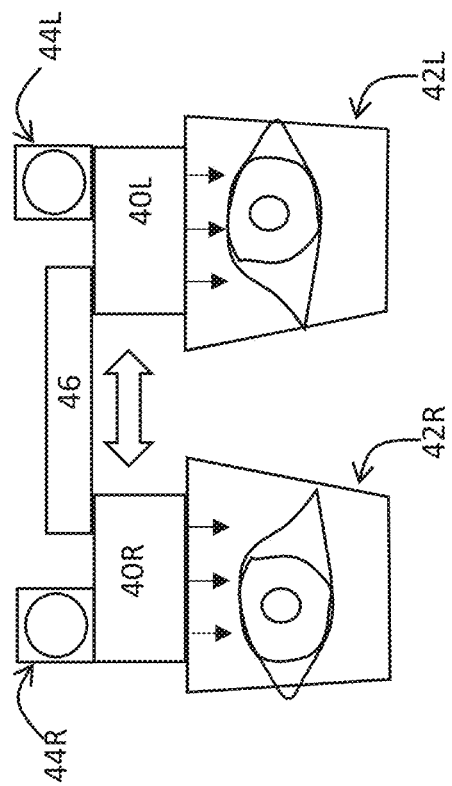
FIG. 3 is a schematic front view of a binocular augmented reality display with an arrangement for adjusting IPD, constructed and operative according to an embodiment of the present invention.

FIG. 3 depicts schematically a front view of the system according to this invention. Optics assemblies 40R and 40L project the image into corresponding see-through optical elements 42R and 42L, preferably implemented as transparent light-guiding optical elements with either partial-reflectors or diffractive optical elements for coupling-out a virtual image onto the right and left eyes of the observer, respectively. Forward facing cameras 44R and 44L are rigidly attached to their adjacent projectors, while a support structure 46, preferably implemented as an adjustable mechanical arrangement, connects the two projectors. This mechanical arrangement can preferably be unlocked to change the distance between the projectors and then locked again before use. This enables IPD adjustment and therefore reduction of projector size and complexity. It is understood that accurate parallelism and orientation cannot typically be maintained after unlocking and locking of arrangement 46.

Figure 4:
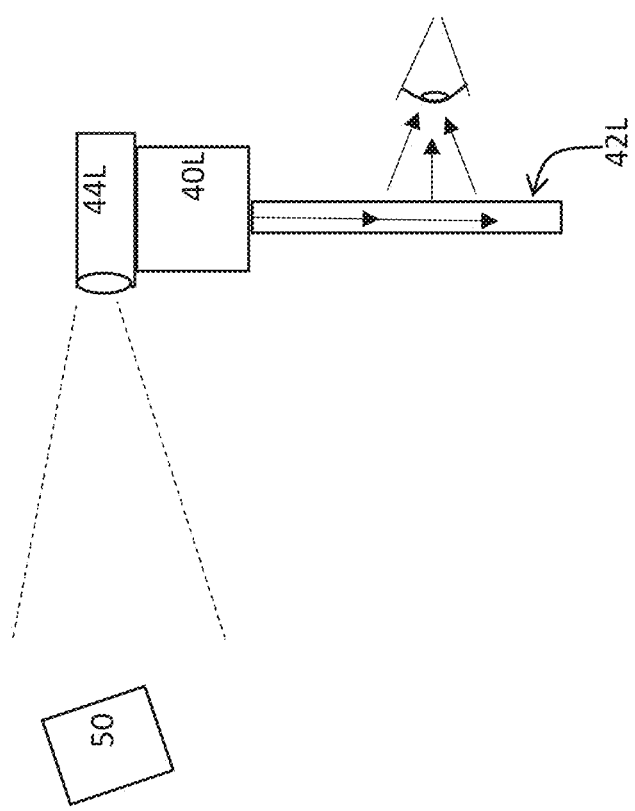
FIG. 4 is a schematic side view of the display of FIG. 3 in use.

FIG. 4 shows a schematic side view representation of the left projector and camera. The light from optics 40L passes through the waveguide 42L and is deflected towards the eye (the method of deflection not being depicted, but typically based on a substrate with internal oblique partially-reflective facets as commercially available from Lumus Ltd., or on an arrangement of diffractive optical elements). Object 50 or the scenery, are imaged by camera 44L. The same object is imaged by the right camera 44R.

The alignment correction process according to this aspect of the invention requires determination of an alignment mapping between each camera and the corresponding augmented reality display for each of the right-eye and the left-eye display units. The transformation parameters between the camera axis and the projector axis are preferably measured after camera-projector integration, preferably as part of the manufacture process. Various techniques may be used to determine the alignment mapping. Two options will now be described with reference to FIGS. 5 and 6.

Figure 5:
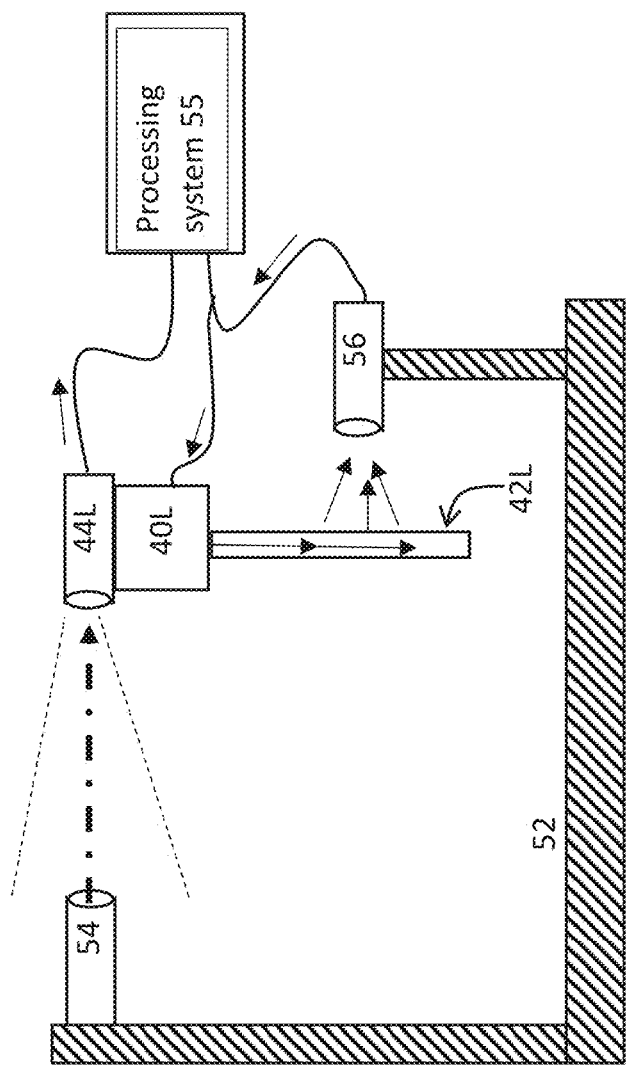
FIG. 5 is a schematic side view of the device of FIG. 4 during a factory partial-calibration procedure according to a first implementation option.

In FIG. 5, an external jig 52 holds firmly co-aligned a projector 54 and a camera 56. The projector and the camera are preferably aligned with their optical axes parallel to each other, and most preferably, with sufficient accuracy such that no transformation parameters are needed between the two. Projector 54 projects a 'reference image' that is received by camera 44L. A processing system injects a similar centered image to projector 40L which generates a projected image which is received via optical element 42L by camera 56. The processing system compares the images from 44L and 56 to define the transformation parameters between 40L and 44L. The distance between 44L and 42L (specifically, the eye-box center of this waveguide) is also preferably recorded for parallax calculations if needed.

Figure 6:
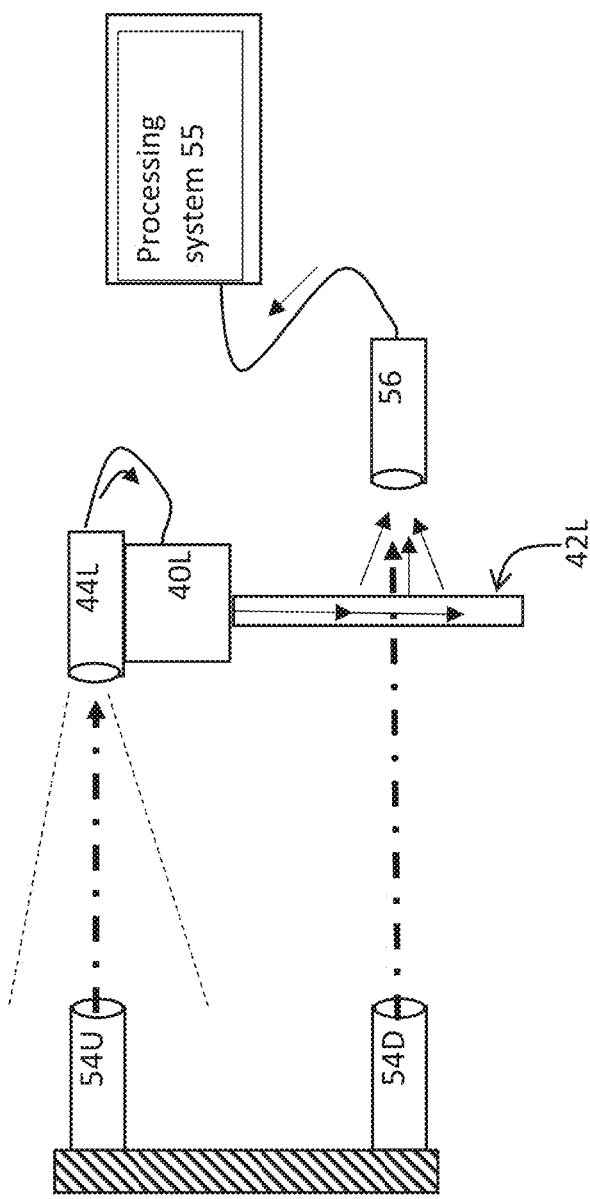
FIG. 6 is a schematic side view of the device of FIG. 4 during a factory partial-calibration procedure according to a second implementation option.
Figure 7:
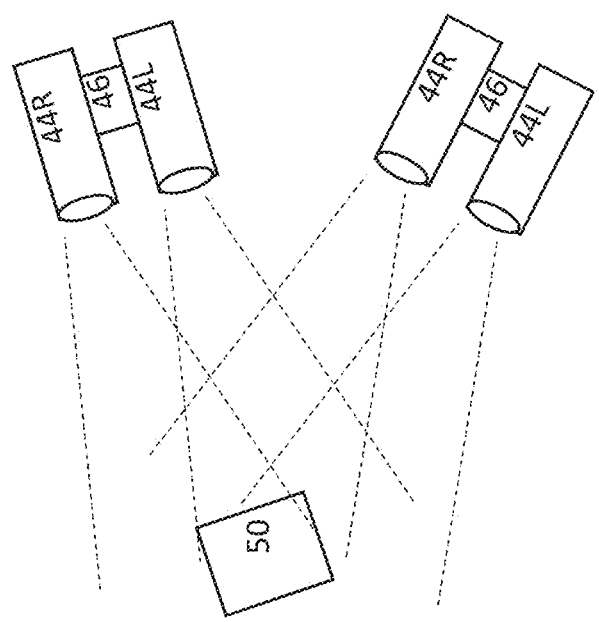
FIG. 7 is a schematic representation of a calibration process including sampling a plurality of images of an object or scene from different directions.

In FIG. 6, two projectors 54U and 54D are rigidly attached (or may alternatively be implemented as a single projector having a sufficiently large aperture) and project a calibration image, typically collimated at infinity. The image from 54U is received by camera 44L and is "injected" into projector 40L. In this case, camera 56 receives simultaneously through optical element 42L a superposition of the directly viewed image projected by 54D and the image projected by projector 40L. The differences between the two images correspond to the transformation data between projector 40L and camera 44L. Most preferably, an automated alignment process may adjust alignment of the image generated by projector 40L until a sharp (precisely overlaid) image is received by camera 56, although a manually-controlled adjustment process using a suitable graphic user interface (not shown) is also possible. This adjustment need not actually be implemented in the device firmware at this stage, since the final alignment will depend also upon the binocular alignment. To facilitate manual or automated alignment, the alignment image may be an X crosshair or the like, and for clarity of differentiation during the alignment process, the color of the image from 40L may be changed, or the image may be made to blink. The two visually-distinguished X crosshairs then need to be brought into alignment.

If optics on projector 42L generate the virtual image at a finite distance, then it is preferable that the calibration image and conversion of 54U and 54D also be set to this distance, and the image projected from projector 40L be shifted when injected to 42L according to parallax between camera 44L and projector 42L, since the distance parameters are known.

The above alignment processes, illustrated for the left-eye display unit, are clearly repeated (or performed simultaneously) for the right-eye display unit. The result is a well-defined transformation matrix which maps the camera alignment to the display for each of the display units.

After using one of the above alignment techniques, during or after manufacture, to derive the alignment transformation between each projector and its corresponding camera, the cameras can then be used in a calibration process performed by the end user to measure and correct misalignment between the two projectors whenever required, for example, after adjustment of the IPD, or as an automated self-calibration process performed intermittently or, in certain preferred applications, whenever the device is powered-on.

Solving the relative orientation of cameras 44L and 44R (after IPD adjustment, as described for FIG. 3) is particularly straightforward when the cameras are sampling images for a distant scene, since parallax between the two sampled images is negligible. "Distant" in this context would ideally be any distance over about 100 meters, which ensures that angular variations due to convergence between the eyes/cameras are smaller than the angular resolution of human visual perception. Practically, however, "distant" here may include any distance over 30 meters, and in some cases, distances of 10 or 20 meters may also allow use of this simplified calibration process with acceptable results. Thus, in a case of user-actuated calibration, the user can be instructed to direct the device towards a distant scene before initiating the calibration process. Similarly, where the device is used in an outdoor environment, the device may be configured to detect, either via a ranging sensor or by image processing, when the cameras are viewing a distant scene. Calibration can then be formed by sampling images from the distant scene from each camera 44L and 44R, and performing image comparison/registration between the two images to determine a transformation between the cameras.

Straightforward image registration may sometimes be used for the alignment correction even where the scene is at short range, so long as there is little "depth" to the scene and both cameras essentially sample the same image. One such example would be calibration by imaging a flat surface such as a poster or other picture or texture on a wall. In this case, information is needed regarding the distance from the cameras to the surface, in order to correct for the convergence angle.

In order to allow calibration in a range of situations where "distant scenery" may not be available, or for a more robust calibration process suitable for being performed automatically without user cooperation, calibration can also be performed using nearby objects, for which parallax between the cameras is significant. In this case, a 3D reconstruction is needed in order to 'solve' the relative camera positions. Movement of the cameras may be needed to generate multiple images for accurate solutions, as illustrated schematically in FIG. 7. Algorithms for this calculation are well known, for example, in the literature and open-source code libraries relating to SLAM (simultaneous location and mapping) processing. By employing these algorithms, a 3D reconstruction (or "model") of at least part of the scene is generated for each camera. The offset of the reconstruction between the cameras is used to determine the offset (spatial and orientation) between the projectors.

Where SLAM processing is used to derive a model, a scaling factor is needed to fully resolve the model. This scaling factor may be derived from any of a number of sources including, but not limited to: a known distance between the two cameras in the case of a device without IPD adjustment; a measured distance between the two cameras, where an encoder is included on the IPD adjustment mechanism; camera motion as derived from an inertial motion sensor arrangement integrated with the device; a distance to a pixel location within one of the images as derived, for example, by a rangefinder integrated with the device; identification of an object of known dimensions included within the field of view of the images; and introduction of additional parameter constraints such as, for example, objects known to have straight edges or the like.

Figure 8:
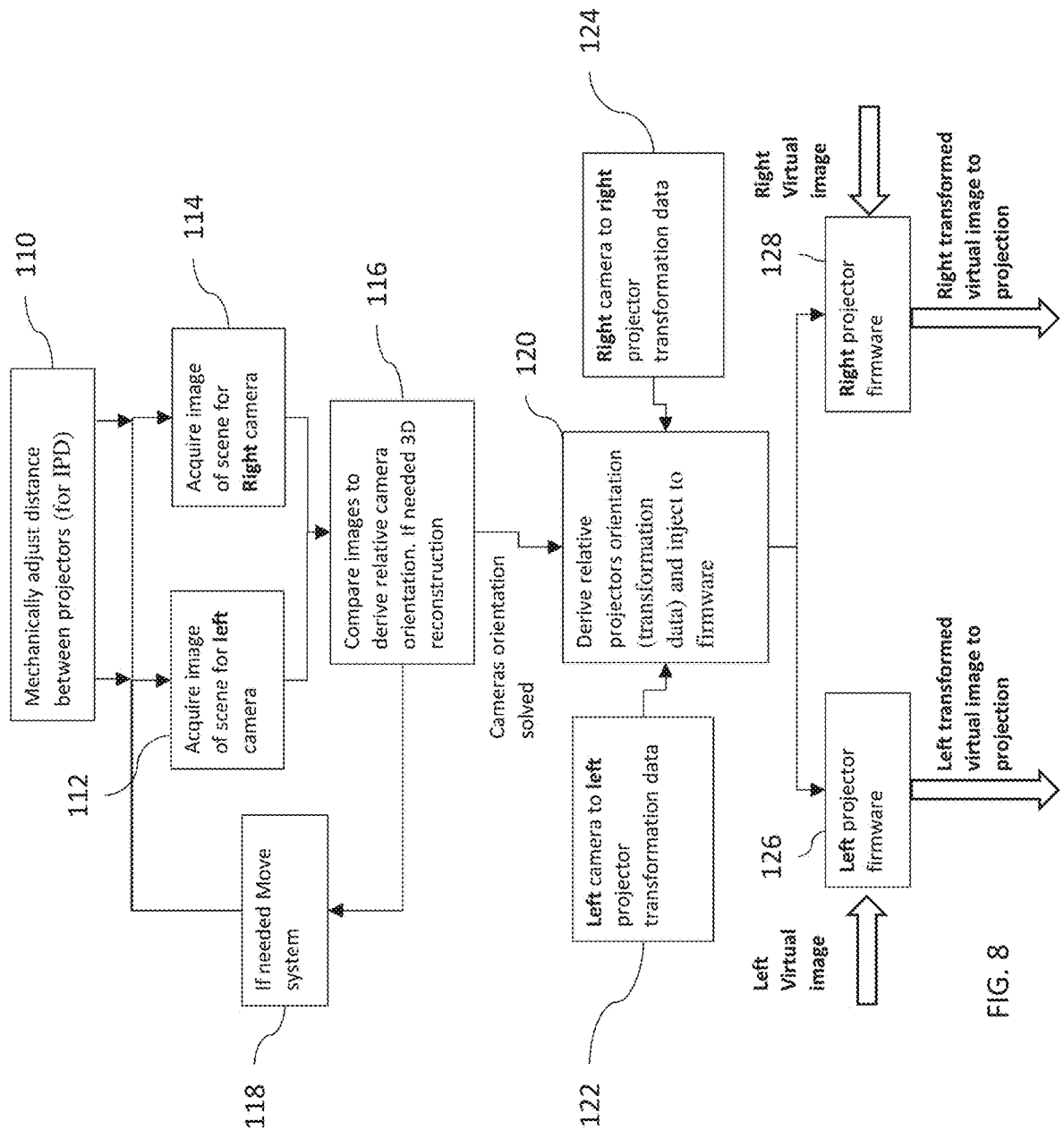
FIG. 8 is a flow diagram illustrating a method for alignment calibration for the augmented reality display of FIGS. 3 and 4 according to an aspect of the present invention.

An exemplary overview of the total overall process in a case of IPD adjustment and subsequent realignment is shown in FIG. 8. First, the process here is assumed to be initiated after an adjustment of distance between the projectors, such as by an IPD adjustment (step 110), and may be user-initiated or automatically triggered. The process can also be implemented as an automatic or semi-automated process, performed on start-up of the device or triggered manually or by a software trigger signal, optionally with prompts generated to prompt the user to move relative to the viewed scene.

Once triggered, the device acquires images of the scene for the left camera (step 112) and the right camera (step 114), and the processing system (onboard the device, local or remote) compares the images to derive the relative orientations of the two cameras (step 116). Where the simple registration process fails due to parallax variations between the images, the system preferably samples additional images and waits for motion if required (step 118) to derive an at least partial 3D model of part of a field of view, thereby allowing derivation of the relative camera orientations. At step 120, this relative camera orientation data is used together with the previously-derived left camera to left projector transformation data (122) and right camera to right projector transformation data (124) to determine an overall alignment correction for each projector which is introduced into the corresponding firmware (steps 126 and 128), thereby allowing a left virtual image to be converted to a left transformed virtual image for projection from projector 40L and a right virtual image to be converted to a right transformed virtual image for projection from projector 40R, so as to generate correctly aligned viewed images.

Figures 9A, 9B, 9C:
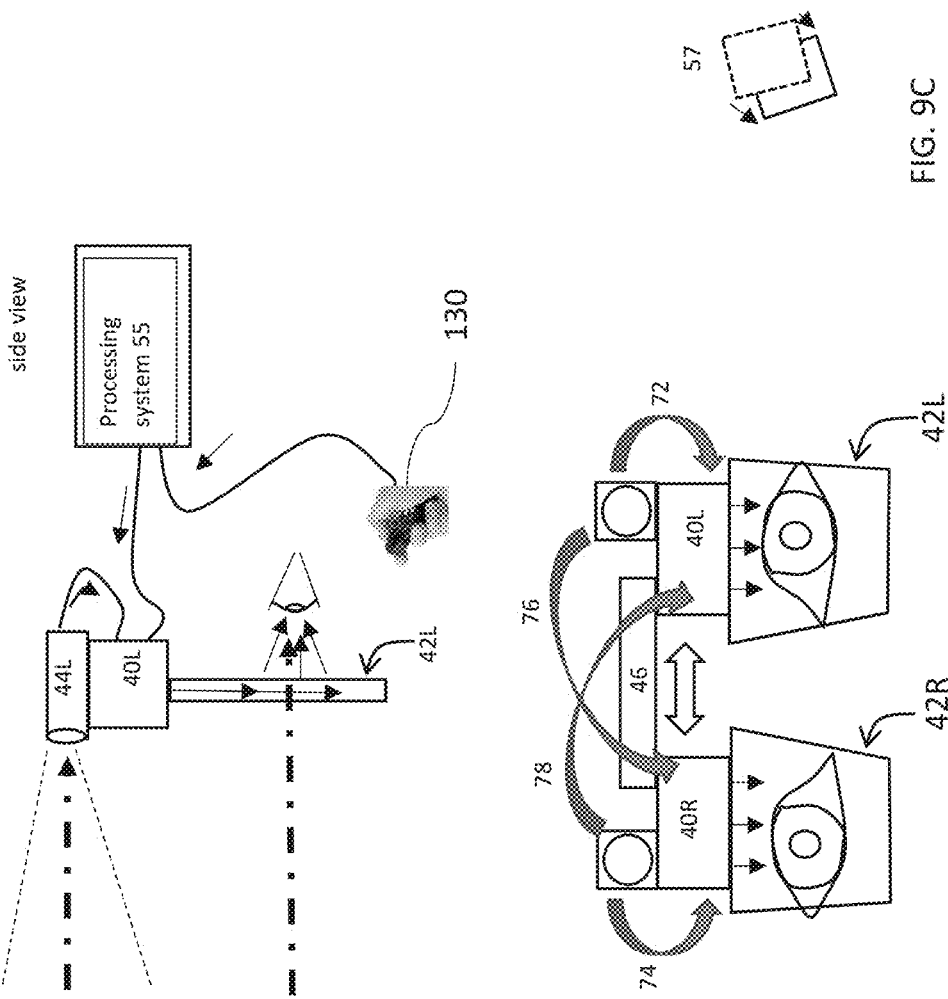
FIGS. 9A and 9B are side and front schematic views, respectively, of an augmented reality display device employing an alternative technique for alignment calibration.
FIG. 9C is a schematic representation of an alignment adjustment performed by a user according to this aspect of the present invention.

Turning now to a second subset of methods of alignment correction for the right-eye and left-eye displays of a binocular augmented reality display device, FIGS. 9A and 9B illustrate schematically an arrangement in which a user provides input to define at least part of the alignment correction. Thus, in FIG. 9A, there is shown an optical device similar to that of FIGS. 3 and 4, but with addition of a user input device 130, which may be a joystick, a touchscreen or any other suitable user input device, optionally implemented as an APP running on a mobile electronic device. As before, this approach assumes the presence of a left camera 44L spatially associated with the left-eye augmented reality display (projector 40L and out-coupling optical element 42L), and corresponding elements (a right camera spatially associated with the right-eye augmented reality display) for the right-eye side of the device (not shown).

It is a particular feature of certain particularly preferred implementations according to this aspect of the present invention that the alignment correction method includes a first cross-registration process including:
   i. obtaining at least one image of a scene sampled by the right camera,
   ii. displaying via the left-eye augmented reality display at least one alignment feature derived from the at least one image sampled by the right camera,
   iii. receiving an input from the user indicative of an alignment offset between the at least one alignment feature and a corresponding directly-viewed feature of the scene, and
   iv. correcting a position of display of the at least one alignment feature according to the user input until the at least one alignment feature is aligned with the corresponding directly-viewed feature of the scene. This defines a transformation represented schematically by arrow 78 in FIG. 9B.

Most preferably, the alignment process also includes the reverse cross-registration process, namely:
   i. obtaining at least one image of a scene sampled by the left camera,
   ii. displaying via the right-eye augmented reality display at least one alignment feature derived from the at least one image sampled by the left camera, iii. receiving an input from the user indicative of an alignment offset between the at least one alignment feature and a corresponding directly-viewed feature of the scene, and iv. correcting a position of display of the at least one alignment feature according to the user input until the at least one alignment feature is aligned with the corresponding directly-viewed feature of the scene. This defines a transformation represented schematically by arrow 76 in FIG. 9B.

The user inputs are then used to implement an alignment correction to the augmented reality display device. Where each camera is rigidly mounted relative to the corresponding augmented reality display, as in the examples described above, the alignment correction is implemented using relative alignment data for the right camera relative to the right-eye augmented reality display (arrow 74) and relative alignment data for the left camera relative to the left-eye augmented reality display (arrow 72). Such data may be made available through a factory alignment process, such as was described above with reference to FIGS. 5 and 6.

In a more general case, where transformations 72 and 74 are unknown, or may vary due to non-rigid (e.g., adjustable) mounting of the left/right displays relative to the cameras, transformations 72 and 74 may be obtained by at least one additional registration process to receive user inputs for correcting an alignment of at least one of the right-eye augmented reality display and the left-eye augmented reality display relative to the corresponding one of the right camera and the left camera. These registrations processes can be performed in essentially the same way as the cross-registration processes described herein.

If all four transformations 72, 74, 76 and 78 are determined, there is some redundancy of information, since any three of these transformations are in principle sufficient to determine an overall calibration matrix between the two displays. In practice, such redundancy is used to advantage to improve accuracy of the alignment correction.

During the alignment process, each projector is activated separately. A typical sequence of operation according to this approach would proceed as follows:

1) The user is instructed to look at scenery objects located at the same nominal distance (apparent distance) as the virtual image. The process is most simply implemented using "distant" objects, to avoid issues of parallax compensation, although the parallax issues can also be corrected, as discussed below.

2) The processing system injects the image from the camera of one eye onto the adjacent projector, so that the observer sees same augmented and 'real world' overlapping. If the scene is not a "distant" scene, parallax compensation is introduced to the projected image, according to an estimated distance to the scene. A shift mismatch (offset) 57 (FIG. 9C) exists if the camera and projector axes (after parallax compensation) are not accurate.

3) The observer controls manually the position and rotation of the virtual image and moves the augmented reality image to overlap the 'real world' image 57 (mapping 72).

4) This process is repeated for second eye to generate mapping 74. Thus far, the calibration achieved is between each camera and its adjacent projector.

5) The processing system injects the image from the camera of one eye (44L) onto the opposite projector (40R) and lets the user align the image, to determine mapping 76. The same is repeated for the opposite camera and projector to generate mapping 78. Now the two projectors and both cameras orientations are calibrated.

The image (alignment feature) projected for this alignment process may be at least part of the sampled image. In this case, the user gets a "double-vision" effect of superimposed images which do not quite fit, and adjusts the alignment until they are properly superimposed.

Alternatively, the projected alignment feature image may include one or more location marker derived from the sampled images by image processing, and corresponding to a feature detected in the sampled image. This may be an outline of an object, or a number of markers designating "corner" features in the image. In this case, the user aligns these location markers with the corresponding features in the real-world view.

Where the above process is performed using a scene which is not a distant scene, an estimate of distance to the scene is needed in order to perform parallax corrections based on a known distance between each camera and the corresponding EMB center. This distance may be input by the user, or may be derived by the system from any combination of available sensors and/or image processing, depending on details of the application, as is known in the art. Non-limiting examples of how the distance may be derived include: employing a rangefinder sensor, performing SLAM processing on images to derive a 3D model (as further detailed above), and sampling images containing an object with known dimensions.

Many projectors include optics that project the virtual image to a finite distance. In this case the calibration is preferably performed while viewing a scene at a distance matching the apparent distance of the virtual image. For example, if the virtual image is focused to 2 meters, the calibration should preferably also be performed on a scene or object located at a distance of about two meters. The injected image from the camera to the projector is shifted according to parallax between the camera and the projector (relative distance is known) at the specified distance and center of field.

It is important to note the alignment procedures described here are applicable also if the two projector/camera pairs are combined rigidly during production process, i.e., without adjustable spacing for the IPD. In this case, transformations 72 and 74 are typically precalibrated, as described above, and only transformations 76 and 78 are achieved through user input.

In all of the cases herein where reference is made to "stereoscopic alignment correction", this is typically implemented through generating a calibration matrix relating each eye to the real world, or defining a relationship between the eyes.

An alternative approach to performing the cross-alignment of projectors for binocular augmented reality can be achieved without reliance on outwards-looking cameras (which may or may not be present in the product). Instead, this third subset of alignment correction techniques employs a camera, separate from the augmented reality display device, to sample images simultaneously from both the right-eye display and the left-eye display, and then derives an alignment correction from the image. An exemplary implementation of this alternative approach is presented below.

In general terms, a method for deriving an alignment correction between a right-eye display and a left-eye display of a binocular augmented reality display device according to this aspect of the present invention includes the steps of:

a) positioning a camera having a field of view so that the camera field of view includes simultaneously part of a projected image from the left-eye display and part of a projected image from the right-eye display;
b) projecting via each of the right-eye display and left-eye display at least part of a calibration image including at least one right-field alignment feature and at least one left-field alignment feature;
c) employing the camera to sample an image;
d) identifying within the image the right-field alignment feature and the left-field alignment feature; and
e) deriving from a position within the image of the right-field alignment feature and the left-field alignment feature an alignment correction between the right-eye display and the left-eye display of the augmented reality display device.

Figure 10B:
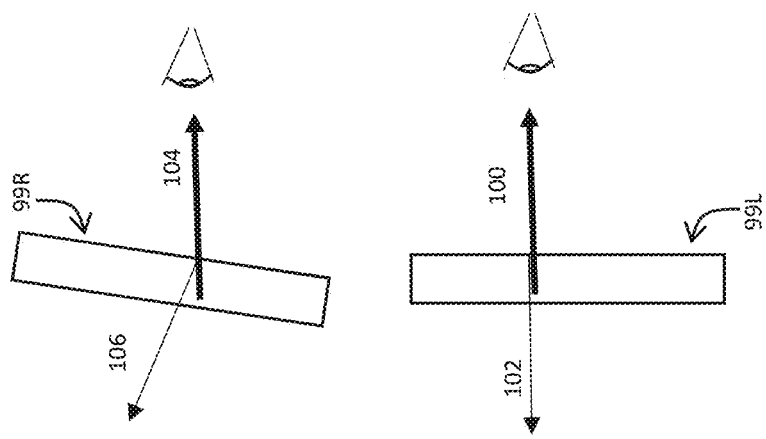
FIG. 10B is an enlarged schematic side view showing two possible geometries of light guiding optical elements for delivering an augmented reality image to the eye of a user.
Figure 10A:
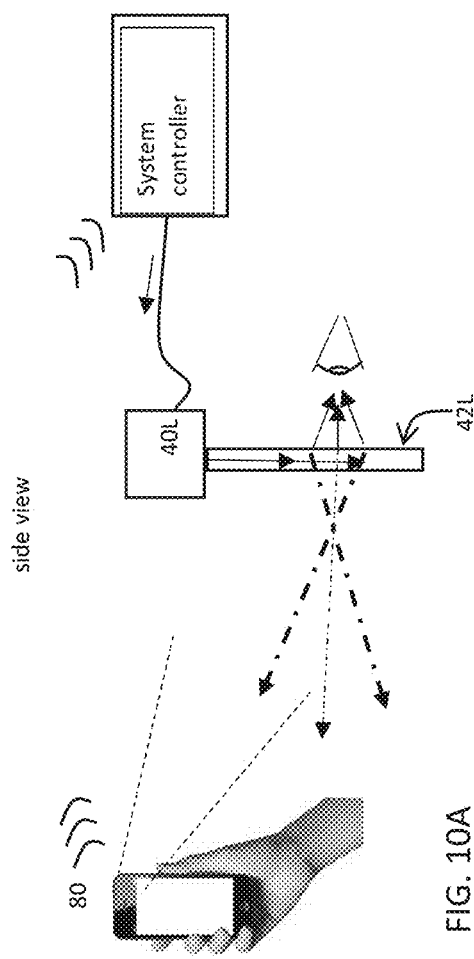
FIG. 10A is a schematic side view of an augmented reality display device during implementation of an alignment calibration according to a further aspect of the present invention.

One implementation of this approach is illustrated here schematically in FIG. 10A. It will be noted that some of the light projected by waveguide 42 toward the observer eye is reflected forward (i.e., outwards from the user), for example, by the external surface of the waveguide closest to the eye. In the implementation illustrated here, it is this outwardly reflected light that is detected by a camera 80 positioned on an opposite side from the viewing side of the augmented reality display device 40L, 42L so that the camera captures an outwardly reflected portion of image illumination from each of the right-eye display and the left-eye display.

The system controller injects an image to projector 40 that illuminates the eye through waveguide 42 as shown by the solid line arrows. Some of the light is reflected in the opposite direction as shown by the dash-dot line arrows.

A camera on a portable device 80 receives at least part of the forward reflected image and transmits the image to the system controller for processing. (The camera is here illustrated only schematically, and will clearly be oriented facing towards the projector and positioned to capture part of the forward-reflected image illumination.) The processing can optionally be performed in the portable device itself.

Although only part of the field is received by camera 80, the image is designed so that it is possible to derive what part of the image is received, as discussed further below with reference to FIG. 11D. From that part, the processor derives the orientation of the camera relative to the forward projected image.

FIG. 10B shows schematically two projectors 99L and 99R, each indicative of the projector orientation for both eyes of the corresponding device. In 99L, the ray 100 is projected toward the observer perpendicularly to the faces of waveguide 99L and reflection 102 is therefore reflected in the opposite direction, along the optical axis. In contrast, in waveguide 99R, an alternative geometry is shown in which the projected image optical axis indicated by output ray 104 is not perpendicular to the surface of waveguide 99R, and the reflected ray 106 is therefore not opposite to 104. Therefore, a calibration matrix should be derived for the offset of 106 relative to 104. This calibration matrix should be derived by comparing forward images (100 and 104) with reflected images (102 and 106) during projector production or as described below.

Figure 11B:
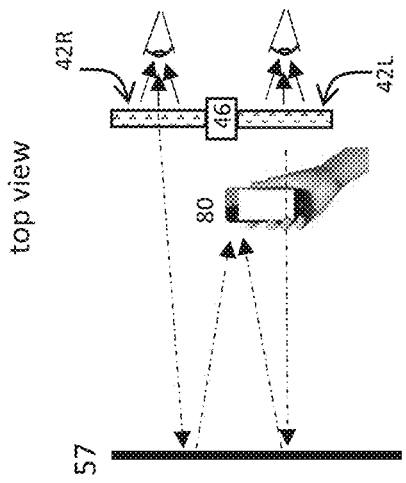
FIG. 11B is a schematic top view of a variant implementation of the arrangement of FIG. 10A.
Figure 11D:
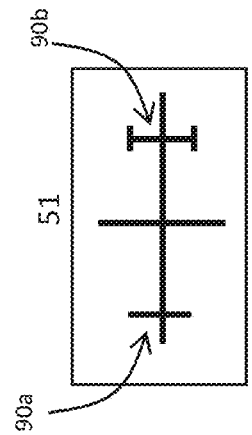
FIG. 11D is a schematic representation of a calibration image for display via the augmented reality display during performance of an alignment calibration according to this aspect of the present invention.
Figure 11A:
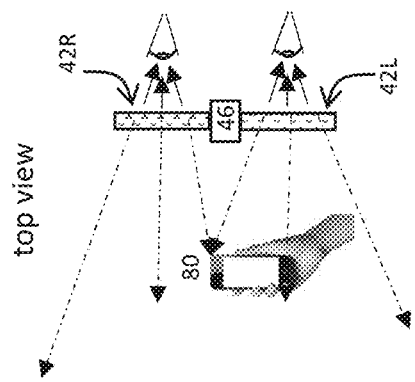
FIG. 11A is a schematic top view of the arrangement of FIG. 10A.

Image acquisition according to this approach is performed simultaneously for both projectors, as shown schematically in the plan view in FIG. 11A. The dot-dashed arrows represent the forward-reflected image. Camera 80 receives different sections of the reflected images from the two projectors and derives the orientation to both fields. By comparing these orientations, it is possible to derive the relative orientation between projectors and correct the alignment electronically, as above.

Improved accuracy of calibration is achieved if camera 80 is placed further from projectors 42. In the case of a hand-held camera, which cannot conveniently be held so far from the device, imaging from a larger effective distance can be achieved by observing the projectors though a mirror 57, as illustrated in FIG. 11B. This mirror-based geometry also allows this calibration technique to be implemented using a built-in forward looking camera of the augmented reality display device itself, particularly in devices provided with a single central forward-looking camera.

Figure 11C:
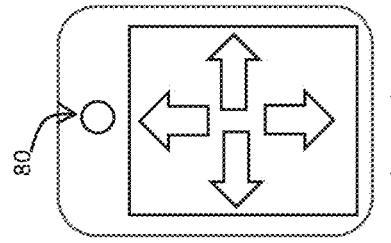
FIG. 11C is a schematic representation of a mobile communications device employed as a camera for the alignment calibration of FIG. 10A.

The orientation of camera 80 can be optimized by providing visual guidance cues to the user for correct positioning of the camera during calibration. For example, if camera 80 is a camera of a mobile device integrated with a screen, such as a mobile phone, at least one indication to a user may be displayed via the screen to assist in correct positioning of the camera, as illustrated in FIG. 11C. Additionally, or alternatively, for any hand-held camera, at least one indication can be displayed to a user via one or both of the augmented reality displays to assist in correct positioning of the camera.

FIG. 11D shows an example of an image that can be projected by the two displays for the calibration process. Other arbitrary images can be used, and this one is presented here as a non-limiting example. The image has clear markings 90a and 90b, which serve respectively as a left-field alignment feature and a right-field alignment feature. The right- and left-field alignment features may be part of a contiguous geometric pattern, or may be isolated features, and are preferably distinguishable from each other. They preferably include features that are easily identified and processed by image processing techniques to derive position and orientation. The image is projected after compensation for any geometrical distortions introduced by the projector itself. It will be noted that only a part of the image is captured by camera 80 from each separate projector. The camera is positioned so that, in the case of a camera on the "outside" of the projector, the sampled image includes the left-field alignment feature viewed via the right-eye display and the right-field alignment feature viewed via the left-eye display.

Figure 11F:
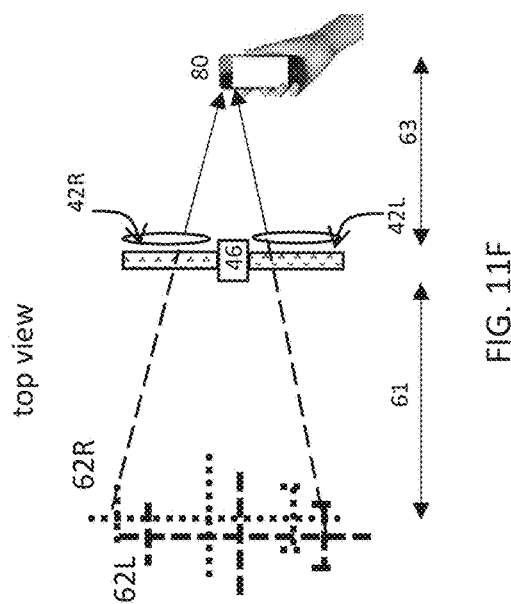
FIG. 11F is a schematic top view of a further variant implementation of the arrangement of FIG. 10A.
Figure 11E:
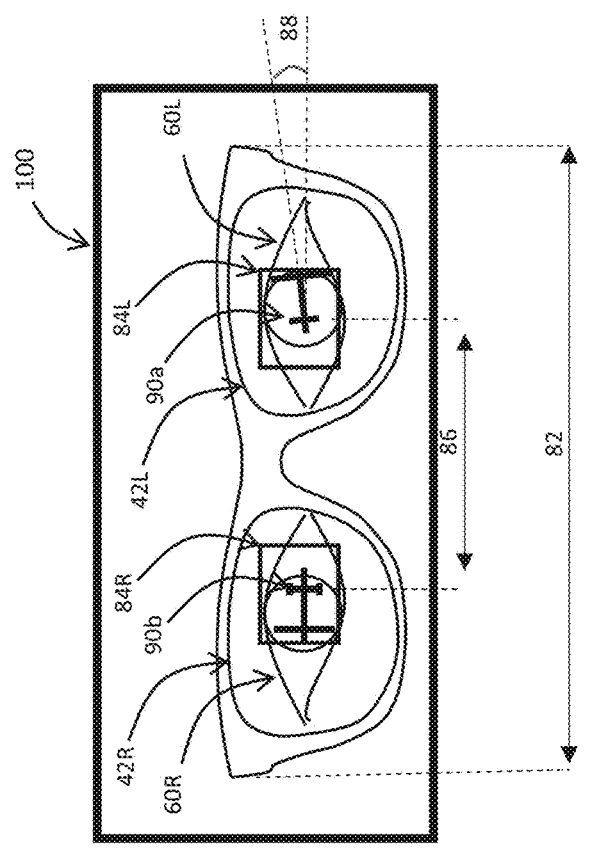
FIG. 11E is a schematic representation of an image sampled by a camera during performance of an alignment calibration according to this aspect of the present invention.

FIG. 11E shows schematically an image 100 received by camera 80. The distance from camera 80 to the glasses can be derived from parameters on the glasses, for example the glasses size 82 in the image. In the waveguides 42R and 42L the reflections of the projected image are apparent as 84R and 84L. The images in both reflections include the markings 90a and 90b. By measuring the angular distance in the image between the markings 86, and considering the parallax caused by the known distance to the glasses, it is possible to know the actual misalignment between the projectors 42R and 42L. Angular misalignment can also be derived as shown by the skew angle designated 88. This architecture also enables detection of eye position 60R and 60L. This further improves projection alignment by taking into consideration distortions caused by eye position in the projector eye-box.

In an alternative set of implementations, camera 80 is positioned on the viewing side of the augmented reality display device, i.e., the side from which the user looks through the display. In this case, the sampled image includes the right-field alignment feature viewed via the right-eye display and the left-field alignment feature viewed via the left-eye display. An example of this implementation is shown in FIG. 11F.

It is important that the camera 80 be focused onto the projected image. If lenses are placed in front of projectors 42 then the virtual image 51 will be generated at a finite apparent distance (the apparent focal distance). This should be considered when deriving the parallax introduced to 84R and 84L.

In the example of FIG. 11F, the projector includes lenses so that image 51 is projected as virtual images 62L (from 42L) and 62R (from 42R) at an apparent focal distance 61. These two images should be brought into exact overlapping relation for optimal alignment. The image acquired by camera 80 will be equivalent to 84L and 84R (described in FIG. 11E), and the derivation of the offset between 62L and 62R will consider the distance to the virtual image 61 (preset by the lenses) and to the camera 63 (again derived for example by identifying a dimension of the device 82 in the image).

As mentioned, the distance of camera 80 from the display device can be determined by identifying features associated with the display device, such as a width dimension 82, within the image. Ideally, in order to determine both the distance and orientation of the camera relative to the display device, the processing system preferably identifies within the image features associated with the binocular augmented reality display device sufficient to define at least three, and most preferably four, non-collinear (and for four, non-coplanar) fiducial points. The features may be any feature relating to the shape of the device, or any reference pattern formed on a surface of the device. In cases where the projected calibration image is rendered at a specific focal depth, features of the projected virtual image may also in some cases be used as fiducial points. The fiducial points are then processed to determine a position of the camera relative to the fiducial points, and hence to the projectors.

Figure 12:
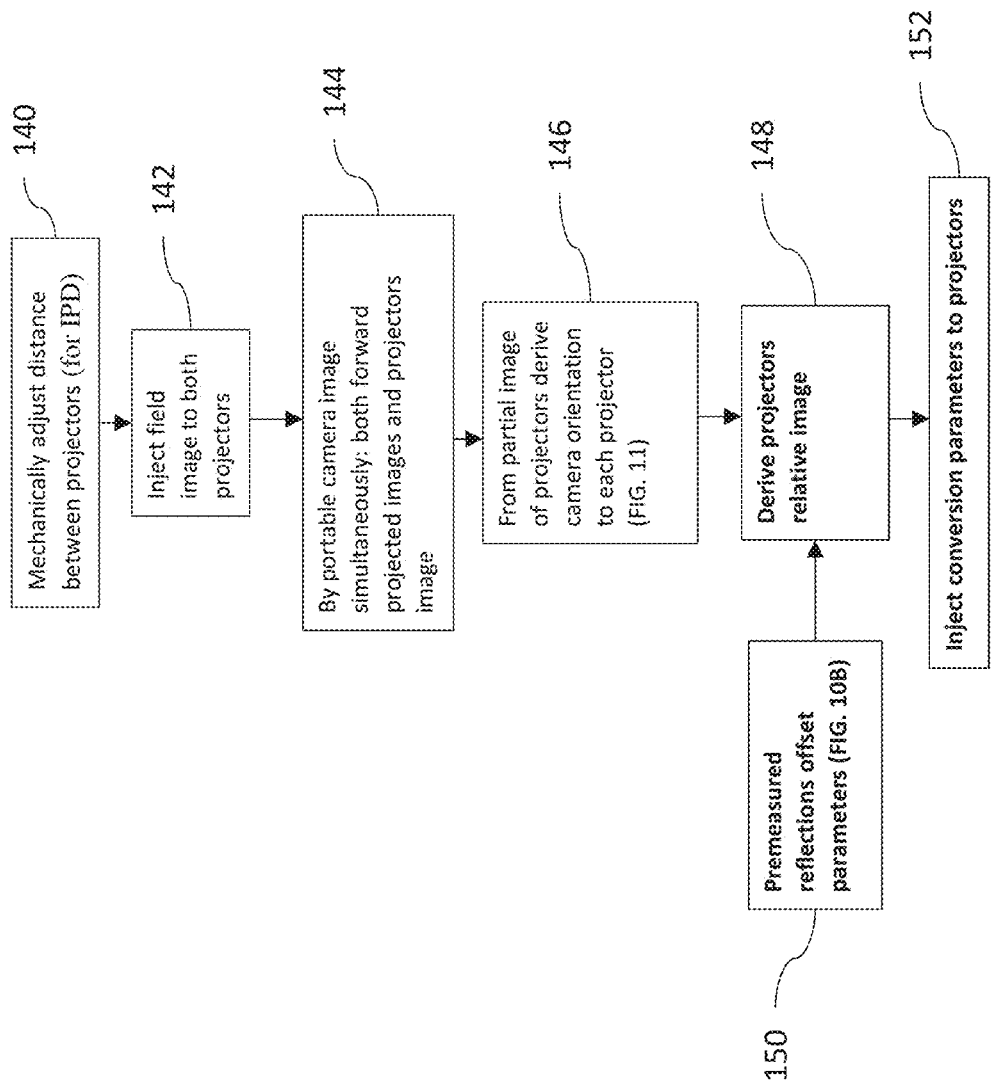
FIG. 12 is a flow diagram illustrating a method for alignment calibration according to the arrangements of FIGS. 10A, 11A, 11B and 11F.

An exemplary non-limiting implementation of this process is described in FIG. 12. As in FIG. 8 above, the calibration may be necessitated by misalignment introduced by IPD adjustment (step 140), although it is not limited to such cases. At step 142, the calibration image or "field image" is "injected" for display via both the right and left eye projectors, and camera 80 is used to sample an image containing a part of the illumination corresponding to the calibration image from each of the projectors, and preferably also imaging the projectors or other features of the display device itself (step 144).

At step 146, the features of the display device are processed to determine the camera orientation relative to each projector. This then provides sufficient information to allow derivation of the relative alignment of the projectors from the parts of the calibration image acquired via each display (step 148). Where camera 80 is used on the outside of the display with outwardly-reflected illumination, and where the image projection axis is non-perpendicular to the surfaces of the waveguide, premeasured reflections offset parameters (150) are also employed in the alignment calculation. The alignment calculations are then used to generate calibration matrices for updating the firmware of each projector (step 152).

The camera on the portable device 80, can also be used to assist the user during a mechanical IPD adjustment itself (before performing the calibration described). According to this option, the user changes the distance between the projectors while the camera transmits continuously the facet image to the processor. The processor compares the eye position to the optical projector position (which may optionally have markings on it to facilitate detection of the projector position), and generates an output to the user (typically an audio signal and/or a visual display) to indicate how the relative position should be further adjusted, or to inform the user when an optimal position has been reached for the user. The calibration process is then preferably performed, as described herein.

It will be appreciated that the above descriptions are intended only to serve as examples, and that many other embodiments are possible within the scope of the present invention as defined in the appended claims.

What is claimed is:

1. A binocular augmented reality system with alignment correction comprising:
   (a) a right-eye display unit comprising a first augmented reality display spatially associated with a first camera, said first camera is a forward-looking camera rigidly associated with said first augmented reality display;
   (b) a left-eye display unit comprising a second augmented reality display spatially associated with a second camera, said second camera is a forward-looking camera rigidly associated with said second augmented reality display;
   (c) an adjustable support structure providing an adjustable inter-pupil distance (IPD) between said right-eye display unit and said left-side display unit; and
   (d) a processing system comprising at least one processor, said processing system in data communication with said first and second cameras and with said first and second augmented reality displays, said processing system being configured to determine an alignment correction between said first and second augmented reality displays for binocular display of images, said alignment correction comprising:
      (a) performing a first cross-registration process comprising:
         (i) obtaining at least one image of a scene sampled by said first camera,
         (ii) displaying via said second augmented reality display at least one alignment feature derived from said at least one image sampled by said first camera,
         (iii) receiving an input from the user indicative of an alignment offset between the at least one alignment feature and a corresponding directly-viewed feature of the scene, and
         (iv) correcting a position of display of the at least one alignment feature according to the user input until the at least one alignment feature is aligned with the corresponding directly-viewed feature of the scene;
      (b) performing a second cross-registration process comprising:
         (i) obtaining at least one image of a scene sampled by said second camera,
         (ii) displaying via said first augmented reality display at least one alignment feature derived from said at least one image sampled by said second camera,
         (iii) receiving an input from the user indicative of an alignment offset between the at least one alignment feature and a corresponding directly-viewed feature of the scene, and
         (iv) correcting a position of display of the at least one alignment feature according to the user input until the at least one alignment feature is aligned with the corresponding directly-viewed feature of the scene; and
      (c) deriving said alignment correction based on said user inputs.

2. The system of claim 1, wherein said processing system is responsive to a user input to determine said alignment correction.

3. The system of claim 1, wherein said processing system is configured to determine said alignment correction intermittently.

4. The system of claim 1, wherein said processing system is configured to determine said alignment correction while a user is looking through said first and second augmented reality displays.

5. The system of claim 1, wherein said right-eye display unit, said left-eye display unit and said adjustable support are part of an augmented reality device, and wherein at least part of said processing system is an onboard processing system integrated with said device.

6. The system of claim 1, wherein said right-eye display unit, said left-eye display unit and said adjustable support are part of an augmented reality device, and wherein at least part of said processing system is a remote processing system associated with said device via a short-range or long-range communication connection.

7. The system of claim 1, wherein said processing system is configured to determine a correlation between images from said first camera and said second camera as part of determining said alignment correction.

8. The system of claim 1, wherein said processing system is configured to determine said alignment correction by:
   (i) sampling at least one image from said first camera;
   (ii) sampling at least one image from said second camera;
   (iii) co-processing said images from said first and second cameras to derive an inter-camera mapping indicative of a relative orientation between said first camera and said second camera; and
   (iv) combining said inter-camera mapping with a first alignment mapping between said first camera and said first augmented reality display and a second alignment mapping between said second camera and said second augmented reality display to derive said alignment correction.

9. The system of claim 8, wherein said at least one image sampled from said first camera and from said second camera are multiple images, and wherein said co-processing includes deriving a three-dimensional model of at least part of a scene included in said multiple images.

10. The system of claim 1, wherein said processing system is configured to receive a user input indicative of an alignment adjustment between an alignment feature displayed via said first augmented reality display and a corresponding real-world feature observed by a user, said alignment feature being derived from an image sampled from said second camera.

11. The system of claim 10, wherein said processing system is further configured to receive a user input indicative of an alignment adjustment between an alignment feature displayed via said second augmented reality display and a corresponding real-world feature observed by a user, said alignment feature being derived from an image sampled from said first camera.

12. The system of claim 1, wherein said at least one alignment feature for each of said cross-registration processes is at least part of the sampled image.

13. The system of claim 1, wherein said at least one alignment feature for each of said cross-registration processes is a location marker corresponding to a feature detected in the sampled image.

14. The system of claim 1, further comprising obtaining an estimated distance to an object in the sampled image, said estimated distance being employed to implement said alignment correction.

* * * * *